US008269894B2

(12) United States Patent
Yoon

(10) Patent No.: US 8,269,894 B2
(45) Date of Patent: Sep. 18, 2012

(54) METHOD AND APPARATUS USING PERFORMANCE PREDICTION FOR OPTIMIZATION OF COLOR FIDELITY OF A DISPLAY

(75) Inventor: Youngshik Yoon, Valencia, CA (US)

(73) Assignee: Thomson Licensing, Boulogne Billancourt (FR)

( * ) Notice: Subject to any disclaimer, the term of this patent is extended or adjusted under 35 U.S.C. 154(b) by 275 days.

(21) Appl. No.: 12/735,085

(22) PCT Filed: Dec. 14, 2007

(86) PCT No.: PCT/US2007/025654

§ 371 (c)(1), (2), (4) Date: Jun. 14, 2010

(87) PCT Pub. No.: WO2009/078831

PCT Pub. Date: Jun. 25, 2009

(65) Prior Publication Data

US 2011/0141366 A1 Jun. 16, 2011

(51) Int. Cl.
*H04N 5/57* (2006.01)
*H04N 5/58* (2006.01)

(52) U.S. Cl. ......................... 348/602; 348/552; 348/553

(58) Field of Classification Search .................. 348/602, 348/603, 552, 553, 657, 658, 191; 345/589, 345/590

See application file for complete search history.

(56) References Cited

U.S. PATENT DOCUMENTS

| | | | | |
|---|---|---|---|---|
| 4,708,459 | A | 11/1987 | Cowan | |
| 5,739,809 | A * | 4/1998 | McLaughlin et al. | 345/594 |
| 6,208,326 | B1 * | 3/2001 | Frederick et al. | 345/690 |
| 6,269,217 | B1 * | 7/2001 | Rodriguez | 386/224 |
| 6,618,045 | B1 | 9/2003 | Lin | |
| 6,871,161 | B2 | 3/2005 | Laird | |
| 2005/0259094 | A1 | 11/2005 | Liu | |
| 2007/0091088 | A1 | 4/2007 | Jiao | |
| 2007/0195076 | A1 | 8/2007 | Wan | |

OTHER PUBLICATIONS

European Search Report dated Jun. 2, 2008.

* cited by examiner

*Primary Examiner* — Michael Lee

(74) *Attorney, Agent, or Firm* — Robert D. Shedd; Robert B. Levy; Jorge Tony Villabon

(57) ABSTRACT

An apparatus and method for display color fidelity optimization using performance prediction are provided. A method of the present invention can include obtaining data regarding available display parameters of the display device, obtaining feedback information regarding respective current values of the display parameters of the display device, performing simulations to determine how changes in the display parameters affect a display of the video content on the display, determining a prediction of a performance of the display device based upon the current values of the display parameters, determining an effect of ambient light on at least one of the determined prediction and the display parameters, and optimizing the display parameters in accordance with at least one of the determined prediction and the determined effect of ambient light. In an alternate embodiment, the method can further include recovering one or more original current values of the display parameters subsequent to a change.

24 Claims, 2 Drawing Sheets

METHOD AND APPARATUS USING PERFORMANCE PREDICTION FOR OPTIMIZATION OF COLOR FIDELITY OF A DISPLAY

This application claims the benefit, under 35 U.S.C. §365 of International Application PCT/US2007/25654 and filed Dec. 14, 2007, which was published in accordance with PCT Article 21(2) on Jun. 25, 2009, in English.

FIELD OF THE INVENTION

The present invention generally relates to display calibration, and more particularly, to an apparatus and method for optimizing displayed color fidelity using performance prediction.

BACKGROUND OF THE INVENTION

When video content is initially processed in order to represent the content in accordance with, for example, a director's or content creator's (hereinafter collectively referred to as "content creator") intent, such content is often calibrated in a dark room without consideration of different ambient light conditions likely to be encountered when the content is reproduced on a subsequent consumer's (hereinafter interchangeably referred to as "user") display device. As such when, content is displayed in a user's home the ambient lighting has an effect on the color properties and the viewing experience of the user. In addition, each display system and display technology produces images differently based on their respective capabilities and the default parameter settings.

Displays often provide the user with the capability of adjusting the display parameters, such as hue, tint, brightness, contrast, and so forth. These setting changes are often made to displays in an incremental fashion but there is no logical curve that is employed throughout a setting change. Color fidelity is usually adjusted by forcing the display into a particular setting regardless of a viewer's preference for example, due to the initial factory default settings of the display device and the lack of logical curve throughout the respective setting changes that can be performed by the user on their display device. The viewer needs to re-set the display afterwards if the user desires different settings than the default settings. However, given the lack of a logical curve throughout a setting change, it is quite difficult if not impossible to mimic the content creator's intent when viewing video content.

SUMMARY OF THE INVENTION

These and other drawbacks and disadvantages of the prior art are addressed by the present principles, which are directed to an apparatus and method for optimizing displayed color fidelity using performance prediction.

In one embodiment of the present invention, a method for optimizing a display of video content on a display device includes obtaining data regarding available display parameters of the display device, obtaining feedback information regarding respective current values of the display parameters of the display device, performing simulations to determine how changes in the display parameters affect a display of the video content on the display, determining a prediction of a display performance of the display device based upon the respective current values of the display parameters, determining an effect of ambient light on at least one of the determined prediction and the display parameters and optimizing the display parameters in accordance with at least one of the determined prediction and the determined effect of ambient light. Optionally, the method can further include recovering one or more original current values of the display parameters subsequent to a change.

In an alternate embodiment of the present invention, an apparatus for optimizing a display of video content on a display device includes a data retriever for obtaining data regarding available display parameters of the display device, a feedback device for obtaining feedback information regarding respective current values of the display parameters of the display device, a simulator for performing simulations to determine how changes in the display parameters affect a display of the video content on the display, a predictor for determining a prediction of a display performance of the display device based upon the respective current values of the display parameters, a light interaction calculator for determining an effect of ambient light on at least one of the determined prediction and the display parameters, and an optimizer for optimizing the display parameters of the display in accordance with at least one of the determined prediction and the determined effect of ambient light. In an alternate embodiment of the present invention, the apparatus can further include a recovery device for one or more original current values of the display parameters of the display device subsequent to a change.

BRIEF DESCRIPTION OF THE DRAWINGS

The teachings of the present invention can be readily understood by considering the following detailed description in conjunction with the accompanying drawings, in which.

Figure 1:
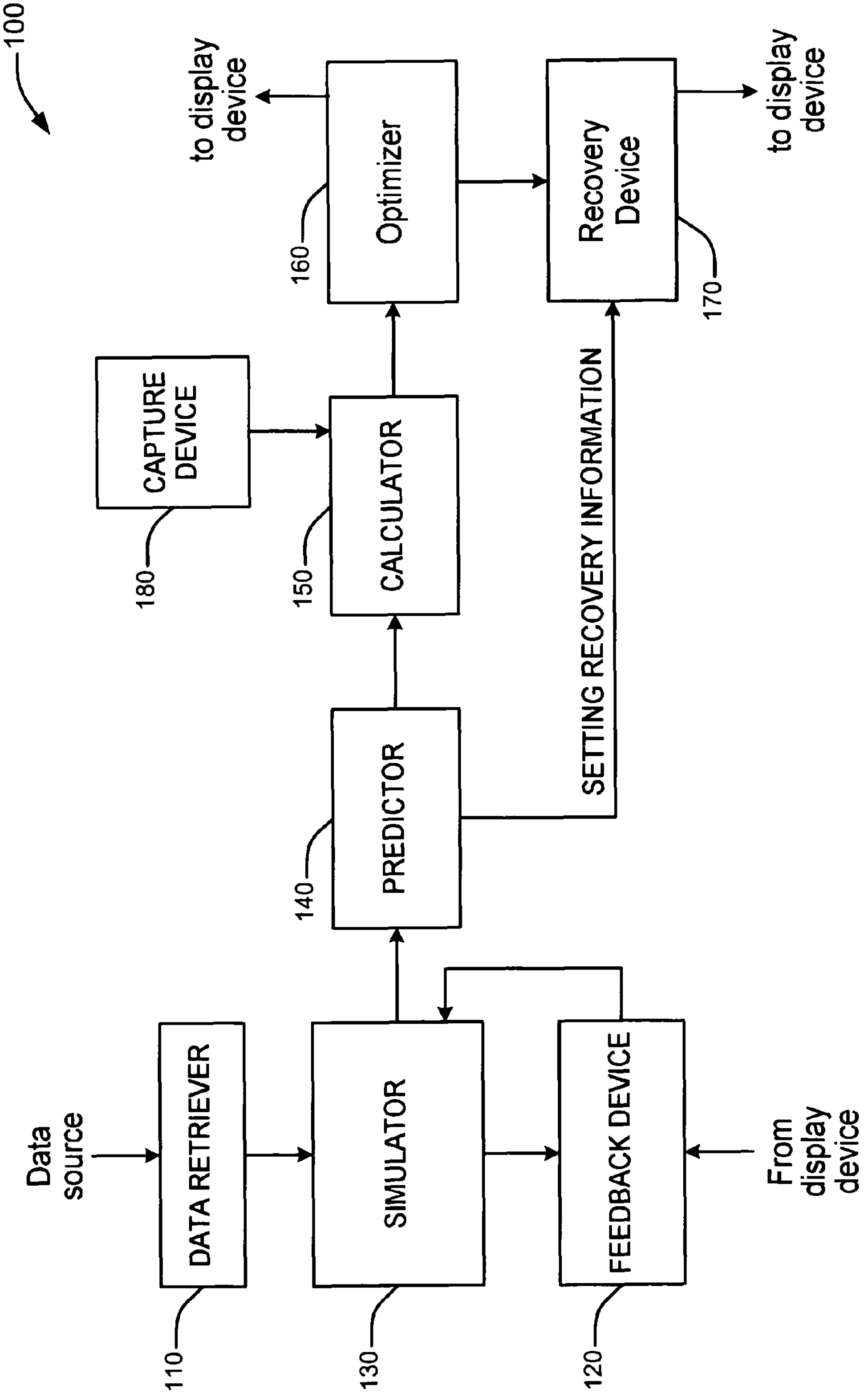
FIG. 1 depicts a high level block diagram of an apparatus for optimizing displayed color fidelity using performance prediction in accordance with an embodiment of the present invention.

It should be understood that the drawings are for purposes of illustrating the concepts of the invention and are not necessarily the only possible configuration for illustrating the invention. To facilitate understanding, identical reference numerals have been used, where possible, to designate identical elements that are common to the figures.

DETAILED DESCRIPTION OF THE INVENTION

The present principles are directed to an apparatus and method for optimizing displayed color fidelity using performance prediction. Advantageously, one or more embodiments of the present principles can involve using feedback from a display device to determine the display device's current settings. Moreover, one or more embodiments of the present principles can involve ascertaining and utilizing the respective capabilities (e.g., range, and so forth) provided by the display device with respect to its settings. The settings can include color gamut, contrast, brightness, and so forth. Further, one or more embodiments of the present invention can involve feedback from an environment in which the display device is employed in order to correct for differences in the environment as such differences affect and/or otherwise relate to the viewing experience intended by a content creator. Even further, one or more embodiments of the present principles can estimate the performance at a current setting with the aid of statistical methodology.

With respect to environmental feedback, in an embodiment of the present invention, a calculation(s) can be made relating to the interaction and/or affect of ambient light with respect to the viewing experience in order to maximize the display device's capacity for color fidelity. Furthermore, using a sensor including, but not limited to, a low cost web-cam type detector capable of capturing chromatic values, in an embodiment, the playback device is able to predict the effects of environmental interference on the display. By using such calculation and prediction with respect to ambient light, the display device of an embodiment of the present invention can optimize the setting parameters corresponding to particular video content to be more in accordance with the intent of the creator of such content. In addition, the prediction can be based on the user's particular settings, or such settings can be stored, so that the original settings can be easily recovered afterwards. Such methodologies in accordance with the principles of the embodiments of the present invention described herein can be applied to automatically adjust for various ambient light levels to maintain, for example, personal color tone preferences.

The functions of the various elements shown in the figures can be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term “processor” or “controller” should not be construed to refer exclusively to hardware capable of executing software, and can implicitly include, without limitation, digital signal processor (“DSP”) hardware, read-only memory (“ROM”) for storing software, random access memory (“RAM”), and non-volatile storage. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those skilled in the art that the block diagrams presented herein represent conceptual views of illustrative system components and/or circuitry embodying the principles of the invention. Similarly, it will be appreciated that any flow charts, flow diagrams, state transition diagrams, pseudocode, and the like represent various processes which can be substantially represented in computer readable media and so executed by a computer or processor, whether or not such computer or processor is explicitly shown.

FIG. 1 depicts a high level block diagram of an apparatus for optimizing displayed color fidelity using performance prediction in accordance with an embodiment of the present invention. The apparatus 100 of FIG. 1 illustratively comprises a data retriever 110, a feedback device 120, a simulator 130, a predictor 140, a calculator 150, an optimizer 160, a recovery device 170 and a light capture device 180.

In the system 100 of FIG. 1, the data retriever 110 receives data from a data source (not shown), including, but not limited to a set top box, the Internet and/or other network, a storage device, and so forth. That is, the data retriever 110 receives data regarding the capabilities (e.g., color gamut used, range of parameter settings including, but not limited to, colors, brightness, contrast, hue, saturation, etc., and so forth) of a particular display. Such information can be communicated to and retrieved by the data retriever 110 from, for example, a manufacturer of the subject display, websites including such display parameters of a subject display, publications, having such information relating to display devices and their respective capabilities and alternatively, the information can be communicated along with received video content. In various embodiments of the present invention, the data retriever 110 can comprise a set top box connected to the subject display device and/or a memory device and/or memory device reader for receiving the data and communicating the data to the simulator 130, with such data obtained from a source such as a computer, personal digital assistance (PDS), cellular telephone, and so forth. That is, the data retriever 110 communicates the retrieved data to the simulator 130.

The feedback device 120 of the apparatus 100 of FIG. 1 receives and compiles feedback relating to the current status of the respective parameter settings ((i.e., the current values of the individual display settings) of the display device. In various embodiments of the present invention, the feedback device 120 of FIG. 1 can comprise, for example, cabling and/or other communication means and devices (including wireless) for providing such information from a display device to the apparatus 100. The feedback device 120 communicates the information regarding the current display settings of the display to the simulator 130.

At the simulator 130, simulations are performed to determine how respective changes in individual parameter settings affect the ultimate viewing experience (i.e., the displaying of the video content on the display device). However, since the change curve of each respective individual parameter setting is typically not logical and, further, given that most manufacturers are unwilling to divulge such curves and/or other related information as to how parameter setting changes are particularly implemented, in various embodiments of the present invention, a given curve(s) is differentiated in its entirety and the segmental curve is approximated into a linear fitting (e.g., using line fitting). The curve that is differentiated is based on the data retrieved from the data retriever 110 while the linear fitting is based on the information received from the feedback device 120.

The simulations performed by the simulator 130 are communicated to the predictor 140. At the predictor 140 a prediction is generated of the display device performance based on the respective status of the individual parameter settings. The prediction can involve, for example, weighting the various individual parameter settings if individual parameters are linked with each other. In some cases, those parameters are independent and individual weightings are equal to each other because of the absence of a link(s) in one or more parameters. If equal weighting is used for each of the individual parameter settings, then, in one embodiment of the present invention, arithmetic averaging can be utilized to implement such weighting. If disparate weightings are used, then, in alternate embodiments of the present invention, a statistical methodology can be utilized to implement such weighting. In the former case, that is when arithmetic averaging is used, an average can be used for weighting. In the latter case, that is, when a statistical methodology is used, mean values can be used for weighting. In yet alternate embodiments of the present invention, however, other types of weighting approaches and/or non-weighting approaches can also be used for determining a prediction of the display device performance based on the respective status of the individual parameter settings of the display.

The prediction information is then communicated to the calculator 150. At the calculator 150 a calculation of an interaction of ambient light with respect to the viewing experience (i.e., how the video content is perceived by a user), as represented by the prediction, is determined. That is, a calculation is made at the calculator 150 of the effects of ambient light on the display properties. Such calculation can include information regarding a measurement of ambient light by the light capture device 180 which is preferably located in close proximity to at least one of the subject display, a user of the subject display or a remote control for controlling the subject display. In various embodiments of the present invention, the light capture device can include a low cost web camera and/or light detector and/or light sensor. Because some light capture devices output RGB values, a conversion can be performed from RGB to XYZ, and so forth, to for example preserve precision and allow for simple arithmetic operations (e.g., addition, subtraction). In alternate embodiments of the present invention, the light capture device can be an integrated component of a subject display.

The calculations made by the calculator 150 can be applied to a display device by the optimizer 160. That is, corrections or optimization parameters determined by the simulator 130, the predictor 140 and the calculator 150 can be applied to the display parameters of the display for optimizing the display parameters of the display to achieve a desired resultant look (e.g., color values) for content displayed on the display.

Optionally, the recovery device 170 can be used to restore a user's display settings to values existing before a correction was made to the display in accordance with embodiments of the present invention. More specifically, because the prediction made in block 140 was based at least in part on the actual settings of the display before correction or optimization, a recovery of the previous display parameters can be achieved by referring to the information used by the predictor 140. That is, in one embodiment of the present invention, the predictor 140 can optionally include a memory (not shown) for storing information received from the simulator 130 for enabling the recovery of the display parameters of a display for returning the display parameters to values existing before a correction was made to the display in accordance with embodiments of the present invention.

Although in the embodiment of the present invention depicted with respect to the apparatus 100 of FIG. 1 it appears as though the various components are directly connected to each other in the order described above and as depicted in FIG. 1, in alternate embodiments of the present invention, the interconnection between the various components can be accomplished via wired and/or wireless means and/or devices, including but not limited to, radio frequency, optical transmissions (e.g., infrared), wires, WIFI, BLUETOOTH, and the like. In addition, although in the embodiment of the present invention depicted with respect to the apparatus 100 of FIG. 1 it appears as though the various components are individual components, in alternate embodiments of the present invention, the described devices and components can comprise any combination of integrated components and the individual and/or combined components can comprise integrated component(s) of a display device to be optimized/corrected in accordance with the aspects of the present invention.

Furthermore, although the embodiments of the present invention presented above describe a generic situation (i.e., without consideration of particular input content, in various embodiments of the present invention, the analysis of the present invention can also involve sampling and/or otherwise obtaining video information from particular content source, which can be considered in operations performed by one or more of the above described components. That is, the use of video information from the particular input video content enables a displayed version of the video content to be so displayed more in accordance with the content creator's intent, versus simply being based on an optimization that, in turn, is based on the respective capabilities of the corresponding display device on which the video content is displayed and/or the environment in which the display device is utilized.

For example, in one embodiment, a process in which the video information from a particular video content source can be processed and/or otherwise considered with respect to the analysis of the present invention is that the data regarding the display capabilities and current display settings collected as described above can be constrained with respect to its evaluation and subsequent use in accordance with the values and/or range of values implicated by the video information from the particular video content. Of course, the present principles are not limited to the preceding uses of such data and, thus, other uses can also be implemented for such data, while maintaining the spirit of the present principles.

Figure 2:
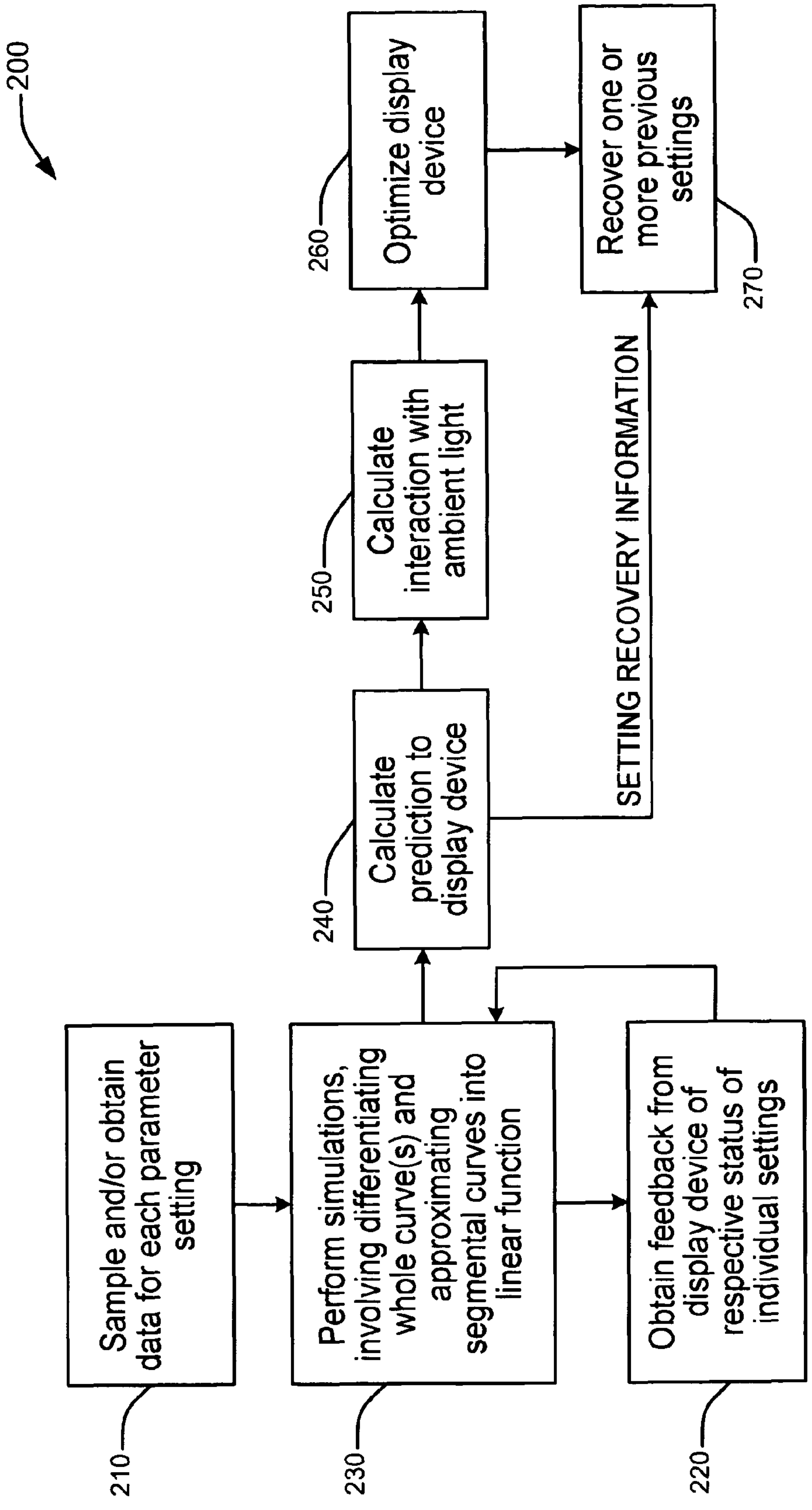
FIG. 2 depicts a flow diagram of a method for optimizing displayed color fidelity using performance prediction in accordance with an embodiment of the present invention.

FIG. 2 depicts a flow diagram 200 of a method for optimizing displayed color fidelity using performance prediction in accordance with an embodiment of the present invention. The method 200 of FIG. 2 begins at step 210 at which data for the parameter settings and ranges (e.g., display parameters) of a display are obtained, in order to determine a given display device's capabilities (e.g., color gamut used, range of display settings including, but not limited to, colors, brightness, contrast, hue, saturation, etc). As previously describe, the retrieval of such information can include obtaining such information from the manufacturer and/or another source(s) such as websites, publications, and the like, relating to display devices and their respective capabilities. The method 200 then proceeds to step 220.

At step 220, feedback relating to the respective status of the individual parameter settings of a display is obtained from the display device (i.e., the current values of the individual display settings on the display device). The method 200 then proceeds to step 230.

At step 230, individual simulations are performed, as described above, to determine how respective changes in individual parameter settings affect the ultimate viewing experience, for example, the displaying of video content on the display device. The method then proceeds to step 240.

At step 240, a prediction is determined of the display device performance based on the respective status of the individual parameter settings as described above. The method 200 then proceeds to step 250.

At step 250, a calculation of an interaction of ambient light with respect to the viewing experience (i.e., how the video content is perceived by a user), as represented by the prediction, is determined as described above. The method 200 then proceeds to step 260.

At step 260, an optimization is applied to the display device based on at least one of the prediction determined in step 240 and the calculation of the interaction of ambient light determined in step 250. The method 200 can then be exited or can optionally proceed to step 270.

At step 270, a recovery of the user's setting(s) is performed as described above.

Having described preferred embodiments for an apparatus and method for optimizing displayed color fidelity using performance prediction (which are intended to be illustrative and not limiting), it is noted that modifications and variations can be made by persons skilled in the art in light of the above teachings. It is therefore to be understood that changes can be made in the particular embodiments of the invention disclosed which are within the scope and spirit of the invention as outlined by the appended claims. While the forgoing is directed to various embodiments of the present invention, other and further embodiments of the invention can be devised without departing from the basic scope thereof.

The invention claimed is:

1. A method for optimizing a display of video content on a display device, comprising:

obtaining data regarding available display parameters of the display device;

obtaining feedback information regarding respective current values of the display parameters of the display device;

performing simulations to determine how changes in the display parameters affect a display of the video content on the display;

determining a prediction of a display performance of the display device based upon the respective current values of the display parameters;

determining an effect of ambient light on at least one of the determined prediction and the display parameters; and optimizing the display parameters in accordance with at least one of the determined prediction and the determined effect of ambient light.

2. The method of claim 1, wherein the data is at least partially representative of a range of the display parameters.

3. The method of claim 1, wherein the data is obtained from at least one of a display device manufacturer and a source of display device specifications.

4. The method of claim 1, wherein the data is obtained from the video content.

5. The method of claim 1, wherein the simulations involve differentiating one or more curves and approximating segmental portions of the one or more curves into a linear fitting, the one or more curves corresponding to the data, and the linear fitting involving applying the respective current values to corresponding ones of the segmental portions of the one or more curves.

6. The method of claim 1, wherein said step of determining a prediction comprises applying weighting to one or more of the respective current values.

7. The method of claim 6, wherein a same weighting factor is used for at least two of the respective current values.

8. The method of claim 6, wherein disparate weighting factors are used for at least two of the respective current values.

9. The method of claim 6, wherein the weighting includes arithmetic averaging.

10. The method of claim 6, wherein the weighting includes a statistical methodology.

11. The method of claim 1, wherein a measurement of ambient light is determined by a light capture device located in proximity to at least one of a the display device, a user of the display device, and a remote control for controlling the display device.

12. The method of claim 1, further comprising recovering one or more original current values of the display parameters of the display device subsequent to a change.

13. An apparatus for optimizing a display of video content on a display device, comprising:

a data retriever for obtaining data regarding available display parameters of the display device;

a feedback device for obtaining feedback information regarding respective current values of the display parameters of the display device;

a simulator for performing simulations to determine how changes in the display parameters affect a display of the video content on the display;

a predictor for determining a prediction of a display performance of the display device based upon the respective current values of the display parameters;

a light interaction calculator for determining an effect of ambient light on at least one of the determined prediction and the display parameters; and an optimizer for optimizing the display parameters of the display in accordance with at least one of the determined prediction and the determined effect of ambient light.

14. The apparatus of claim 13, wherein the data is at least partially representative of a range of the display parameters of the display.

15. The apparatus of claim 13, wherein the data is obtained by the data retriever from at least one of a display device manufacturer and a source of display device specifications.

16. The apparatus of claim 13, wherein the data is obtained by the data retriever from the video content.

17. The apparatus of claim 13, wherein the simulations performed by the simulator involve differentiating one or more curves and approximating segmental portions of the one or more curves into a linear fitting, the one or more curves corresponding to the data, and the linear fitting involving applying the respective current values to corresponding ones of the segmental portions of the one or more curves.

18. The apparatus of claim 13, wherein the predictor applies weighting to one or more of the respective current values in determining the prediction.

19. The apparatus of claim 18, wherein a same weighting factor is applied by the predictor to at least two of the respective current values.

20. The apparatus of claim 18, wherein the predictor applies disparate weighting factors to at least two of the respective current values.

21. The apparatus of claim 18, wherein the weighting includes arithmetic averaging.

22. The apparatus of claim 18, wherein the weighting includes a statistical methodology.

23. The apparatus of claim 13, further including a light capture device for providing a measurement of ambient light, said light capture device located in proximity to at least one of a the display device, a user of the display device, and a remote control for controlling the display device.

24. The apparatus of claim 13, further comprising a recovery device for one or more original current values of the display parameters of the display device subsequent to a change.

* * * * *